(12) United States Patent
Tanaka et al.

(10) Patent No.: US 10,019,030 B2
(45) Date of Patent: Jul. 10, 2018

(54) ELECTRONIC DEVICE

(71) Applicant: Panasonic Intellectual Property Management Co., Ltd., Osaka (JP)

(72) Inventors: Shintaro Tanaka, Osaka (JP); Tsuyoshi Nakashima, Hyogo (JP); Ryo Yonezawa, Kyoto (JP); Haruka Kaneko, Osaka (JP)

(73) Assignee: Panasonic Intellectual Property Management Co., Ltd., Osaka (JP)

(*) Notice: Subject to any disclaimer, the term of this patent is extended or adjusted under 35 U.S.C. 154(b) by 0 days.

(21) Appl. No.: 15/462,442

(22) Filed: Mar. 17, 2017

(65) Prior Publication Data

US 2017/0192456 A1 Jul. 6, 2017

Related U.S. Application Data

(63) Continuation of application No. PCT/JP2015/004750, filed on Sep. 17, 2015.

(30) Foreign Application Priority Data

Sep. 30, 2014 (JP) ................................. 2014-201884

(51) Int. Cl.
  *G06F 1/16* (2006.01)
  *H05K 5/00* (2006.01)
  *H05K 7/00* (2006.01)

(52) U.S. Cl.
  CPC .......... *G06F 1/1618* (2013.01); *G06F 1/1643* (2013.01); *G06F 1/1681* (2013.01); *E05Y 2900/606* (2013.01)

(58) Field of Classification Search
  CPC .... G06F 1/1618; G06F 1/1643; G06F 1/1681; G06F 1/1616; G06F 1/1615; G06F 1/1675

(Continued)

(56) References Cited

U.S. PATENT DOCUMENTS 9,541,954 B1 * 1/2017 Lee ........................ G06F 1/1618
9,594,401 B2 * 3/2017 Liang .................... G06F 1/1618
(Continued)

FOREIGN PATENT DOCUMENTS

JP    2014-067397    4/2014

OTHER PUBLICATIONS

International Search Report of PCT application No. PCT/JP2015/004750 dated Dec. 28, 2015.

*Primary Examiner* — Anthony Haughton
(74) *Attorney, Agent, or Firm* — Hamre, Schumann, Mueller & Larson, P.C.

(57) ABSTRACT

An electronic device of the present disclosure includes a first housing, a second housing, and a hinge part for connecting the first housing and the second housing. The first housing has a first primary surface at which an input unit is disposed, and a second primary surface opposite to the first primary surface. The second housing has a third primary surface provided with a display unit, and a fourth primary surface opposite to the third primary surface. The hinge part connects the first and second housings so that an angle formed by the first and third primary surfaces is capable of 360 degrees of change. The electronic device has a first configuration in which the first and third primary surfaces face each other to form an angle of substantially 0 degrees, and a second configuration in which the second and fourth primary surfaces face each other and the first and third primary surfaces are substantially parallel. At least one of the housings is shaped so that in the second configuration, a first clearance formed between the second and fourth primary surfaces increases in size in a substantially linear manner in a direction away from the hinge parts.

5 Claims, 6 Drawing Sheets

(58) Field of Classification Search
USPC .......................... 361/679.26–679.29, 679.55;
455/575.1–575.9
See application file for complete search history.

(56) References Cited

U.S. PATENT DOCUMENTS

2012/0110784 A1* 5/2012 Hsu ....................... G06F 1/1681
16/226
2014/0063701 A1 3/2014 Kawada et al.

* cited by examiner

ELECTRONIC DEVICE

BACKGROUND

1. Technical Field

The present disclosure relates to an electronic device that includes a first housing, a second housing, and hinge parts for connecting the first housing and the second housing.

2. Description of the Related Art

There is an electronic device having a second housing that can be rotated relative to a first housing. Unexamined Japanese Patent Publication No. 2014-067397, for example, discloses a personal computer (electronic device) that has a bottom cabinet (first housing), a top panel (second housing), and hinge parts for connecting the bottom cabinet and the top panel, and the top panel can be rotated 360 degrees relative to the bottom cabinet. An angle formed by the bottom cabinet (first housing) and the top panel (second housing) is changed in a range of substantially 0 degrees to 360 degrees, thereby enabling this personal computer to have a laptop computer configuration (PC configuration) or a tablet configuration.

SUMMARY

An electronic device of the present disclosure includes a first housing, a second housing, and a hinge part for connecting the first housing and the second housing. The first housing has a first primary surface at which an input unit is disposed, and a second primary surface opposite to the first primary surface. The second housing has a third primary surface provided with a display unit, and a fourth primary surface opposite to the third primary surface. The hinge part connects the first housing and the second housing so that an angle formed by the first primary surface and the third primary surface is capable of 360 degrees of change. Further, the electronic device has a first configuration in which the first primary surface and the third primary surface face each other to form an angle of substantially 0 degrees, and a second configuration in which the second primary surface and the fourth primary surface face each other and the first primary surface and the third primary surface are substantially parallel to each other. At least one of the first housing and the second housing is shaped so that in the second configuration, a first clearance formed between the second primary surface and the fourth primary surface increases in size in a substantially linear manner in a direction away from the hinge part.

In the electronic device of the present disclosure, the at least one of the first housing and the second housing is shaped so that in the second configuration, the first clearance formed between the second primary surface of the first housing and the fourth primary surface of the second housing increases in size in the substantially linear manner in a width direction away from the hinge part. Consequently, damage that is caused by a convex curvature of the opposite surface of the first housing and a convex curvature of the opposite surface of the second housing can be prevented.

DETAILED DESCRIPTION

Exemplary embodiments are described hereinafter with reference to the accompanying drawings, as required. It is to be noted that detailed descriptions that are more than necessary may be omitted. For example, there are cases where detailed description of well-known matters and repeated description of substantially the same structure are omitted for the purpose of preventing the following description from needlessly having redundancy, thereby facilitating understanding by those skilled in the art.

It is also to be noted that the accompanying drawings and the following description are provided to allow those skilled in the art to sufficiently understand the present disclosure and thus are not intended to limit subject matters described in the claims.

First Exemplary Embodiment

1. Overall Structure

Figure 1:
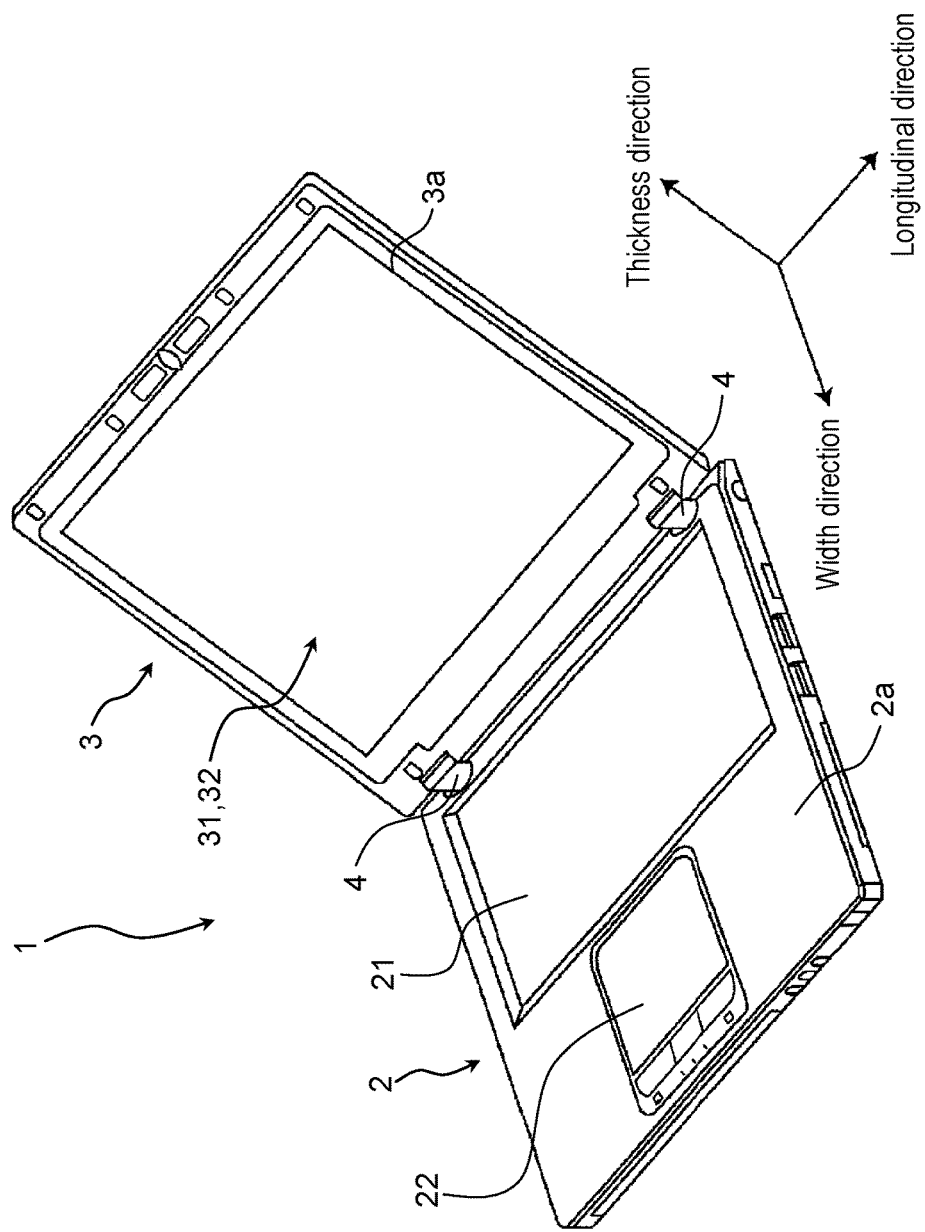
FIG. 1 is a perspective view of a personal computer with a PC configuration according to a first exemplary embodiment of the present disclosure.

FIG. 1 is a perspective view of personal computer 1, illustrating an example of an electronic device of the present disclosure. Personal computer 1 includes first housing 2, second housing 3, and hinge parts 4.

First housing 2 and second housing 3 are each formed by, for example, casting a magnesium alloy. It is to be noted that first housing 2 and second housing 3 may be formed of metal other than the magnesium alloy, resin, or the like.

First housing 2 is provided with, at front surface (first primary surface) 2*a* of first housing 2, keyboard 21 and pointing device 22 that are examples included in an input unit.

Second housing 3 is provided with, at front surface (third primary surface) 3a of second housing 3, liquid crystal display (LCD) panel 31 and touch panel 32 that are examples included in a display unit.

Hinge parts 4 connect first housing 2 and second housing 3 so that an angle formed by front surface 2a of first housing 2 and front surface 3a of second housing 3 can be changed in a range of substantially 0 degrees to 360 degrees (for rotation).

It is to be noted that in the following description, a direction parallel to rotating shafts of hinge parts 4 is a longitudinal direction, a direction orthogonal to the rotating shafts of hinge parts 4 along front surface 2a of first housing 2 is a width direction, and a direction orthogonal to the longitudinal direction and the width direction is a thickness direction. The thickness direction is a direction of a thickness of personal computer 1 with a PC configuration (described later) or a tablet configuration (described later).

Personal computer 1 of the present disclosure can have two configurations, that is, the PC configuration and the tablet configuration. The PC configuration is, as shown in FIG. 1, a configuration (open configuration) in which second housing 3 is rotated about 120 degrees about hinge parts 4 relative to first housing 2. It is to be noted that in the present exemplary embodiment, personal computer 1 with the PC configuration has a side close to a user as a front side, and a side that is opposite to the user as a rear side (provided with hinge parts 4).

Figure 2:
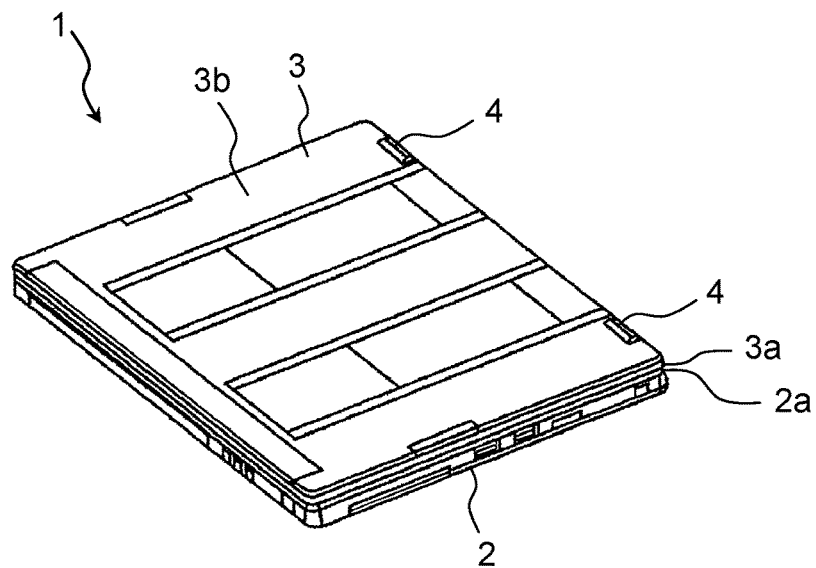
FIG. 2 is a perspective view of the personal computer of FIG. 1 with a closed configuration.

FIG. 2 is a perspective view of personal computer 1 with a closed configuration. The closed configuration mentioned here is, as shown in FIG. 2, a configuration (first configuration) in which front surface 2a of first housing 2 and front surface 3a of second housing 3 form an angle of 0 degrees, in other words, a configuration in which keyboard 21 is disposed to face liquid crystal display (LCD) panel 31 and touch panel 32.

Figure 3:
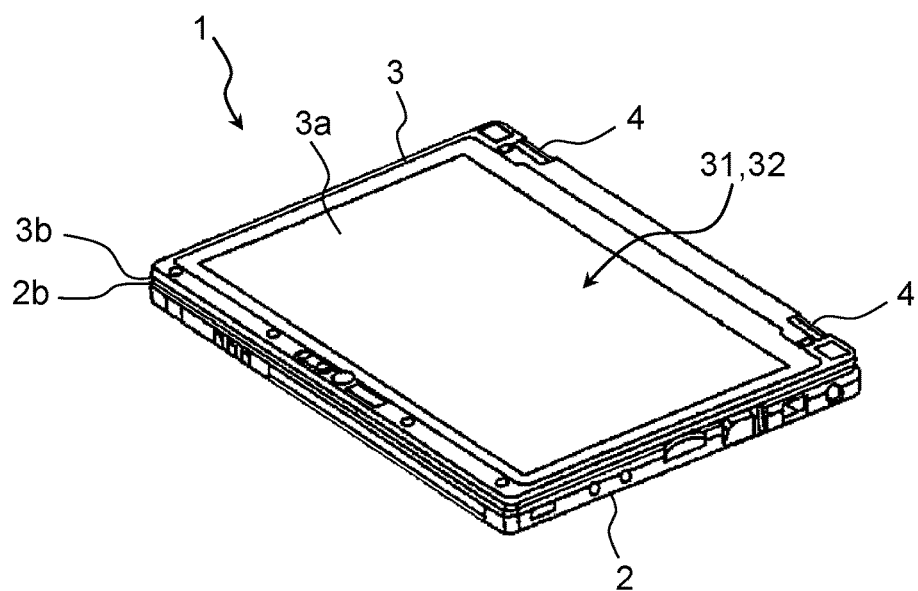
FIG. 3 is a perspective view of the personal computer of FIG. 1 with a tablet configuration, showing a surface provided with a liquid crystal display (LCD) panel and a touch panel.
Figure 4:
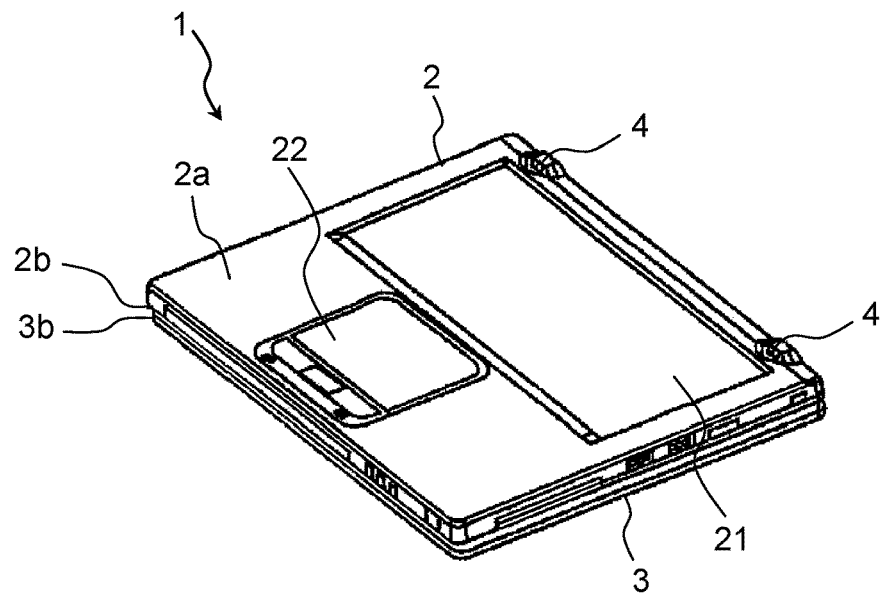
FIG. 4 is a perspective view of the personal computer of FIG. 1 with the tablet configuration, showing a surface provided with a keyboard.

On the other hand, the tablet configuration is, as shown in FIGS. 3 and 4, a configuration (turned inside out configuration) in which second housing 3 is rotated substantially 360 degrees relative to first housing 2. In other words, the tablet configuration is a configuration (second configuration) in which rear surface (second primary surface) 2b of first housing 2 and rear surface (fourth primary surface) 3b of second housing 3 are disposed to face each other and front surface 2a of first housing 2 and front surface 3a of second housing 3 are substantially parallel to each other.

FIG. 3 illustrates personal computer 1 with the tablet configuration seen from liquid crystal display (LCD) panel 31 and touch panel 32. FIG. 4 illustrates personal computer 1 with the tablet configuration seen from keyboard 21.

Figure 5:
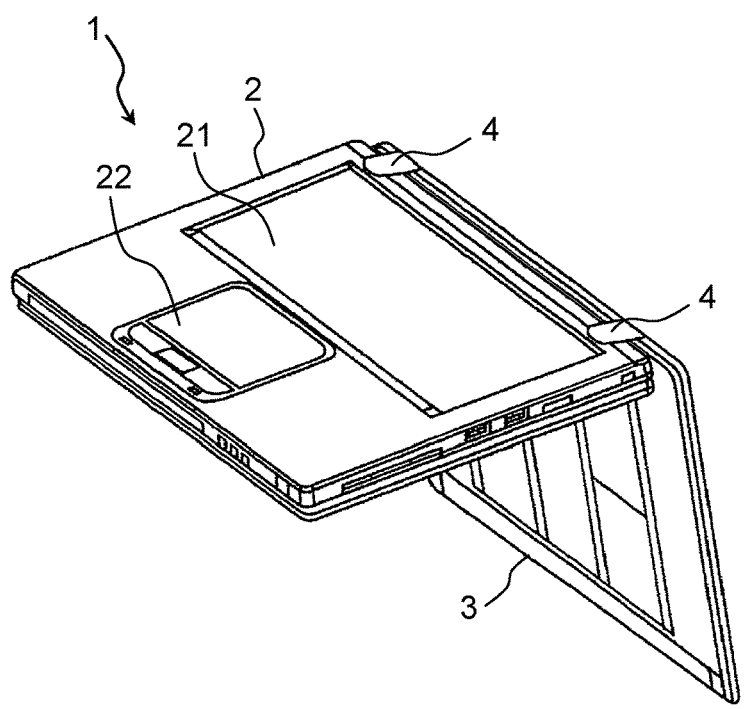
FIG. 5 is a perspective view of the personal computer of FIG. 1 during transition from the closed configuration to the tablet configuration.

FIG. 5 illustrates personal computer 1 during transition from the PC configuration to the tablet configuration. FIG. 3 shows second housing 3 rotated about 240 degrees about hinge parts 4 serving as an axis after conversion from the closed configuration to the PC configuration (FIG. 1). In the PC configuration, input operation of keyboard 21 and pointing device 22 is enabled, so that input operation can be performed through use of these input devices. The input operation can also be effected by touch operation of, for example, characters or pictures on a screen displayed on touch panel 32. In the tablet configuration, the input operation of keyboard 21 and pointing device 22 is disabled, so that the input operation can be effected by the touch operation on touch panel 32.

As described above, hinge parts 4 are constructed to enable substantially 360 degrees of relative rotation of first housing 2 and second housing 3, so that personal computer 1 can have either the PC configuration shown in FIG. 1 or the tablet configuration shown in FIGS. 3 and 4 for use. By with the PC configuration, personal computer 1 of the present exemplary embodiment can thus be used as a laptop personal computer enabling the operation of the input unit such as keyboard 21. With the tablet configuration, personal computer 1 of the present exemplary embodiment can thus be used as a tablet computer enabling the operation using touch panel 32.

Specific Problems Inferred in Connection with the Present Disclosure

In personal computer 1 that is capable of switching between a PC configuration and a tablet configuration through rotation of second housing 3 relative to first housing 2, there is a problem of contact between second housing 3 and first housing 2 in the tablet configuration because of respective convex curvatures of rear surface 2b of first housing 2 and rear surface 3b of second housing 3. To cope with this problem, even when rear surface 2b of first housing 2 and rear surface 3b of second housing 3 have the respective convex curvatures, an increased clearance is conventionally provided between rear surface 3b of second housing 3 and rear surface 2b of first housing 2 in the tablet configuration of personal computer 1 for prevention of abutment between respective rear surfaces 2b, 3b of the first and second housings 2, 3. Because of this, personal computer 1 has an increased thickness when personal computer 1 has the tablet configuration. To reduce the curvatures, increase in thickness of second housing 3 for increased strength, formation of second housing 3 by machining instead of casting and others are conceivable. However, these cases result in a significant increase in weight of personal computer 1. The present disclosure provides technique capable of coping with these problems.

2. Structures of First and Second Housings

Figure 6A:
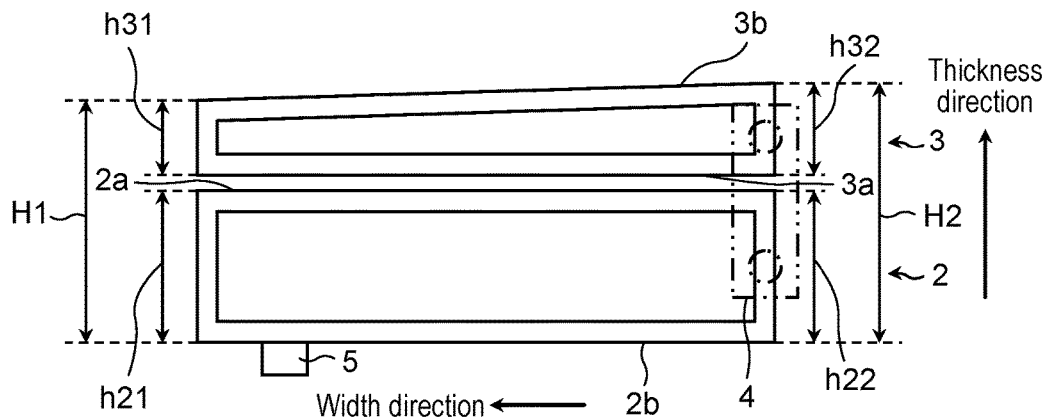
FIG. 6A schematically illustrates a cross section of the personal computer of FIG. 1 with the closed configuration.

FIG. 6A illustrates respective cross sections of first and second housings 2 and 3 that are seen from a side of personal computer 1 with the PC configuration (closed configuration) in which second housing 3 is closed. As shown in FIG. 6A, first housing 2 has a substantially rectangular box shape in cross section. Specifically, first housing 2 has a substantially uniform thickness in the width direction. The reason why the thickness of first housing 2 is substantially uniform is because strictly speaking, first housing 2 does not have a uniform thickness because of being uneven at its surface for ensured robustness. Second housing 3 is formed so that its thickness reduces in the width direction away from hinge parts 4 toward the front side of personal computer 1. First housing 2 has thickness h22 at the rear end (provided with hinge parts 4) of personal computer 1 and thickness h21 at the front end (opposite to hinge parts 4) of personal computer 1, and thickness h22 is, for example, equal to thickness h21. Thickness h21 mentioned here is a thickness of a front end (positioned opposite to hinge parts 4) of first housing 2 and does not include, for example, unevenness of keyboard 21 and unevenness of buttons near pointing device 22. Thickness h22 is a thickness of a rear end (provided with hinge parts 4) of first housing 2 and does not include unevenness of hinge parts 4. On the other hand, second housing 3 is formed to have thickness h31 at its front end and thickness h32 at its rear end, and thickness h31 is less than thickness h32. Second housing 3 is formed so that its thickness h31 is, for example, 0.5 mm less. It is to be noted that reducing the thickness of the rear end of second housing 3 is difficult because a rear portion of second housing 3 accommodates a circuit board (not illustrated) for operation of liquid crystal display panel 31 and touch panel 32. Accordingly, second housing 3 is formed to have the reduced thickness at its front end. Thickness h31 mentioned here is a thickness of the front end (positioned opposite to hinge parts 4) of second housing 3 and does not include, for example, liquid crystal display panel 31. In addition, thickness h32 is a thickness of the rear end (provided with hinge parts 4) of second housing 3 and does not include unevenness of hinge parts 4.

Figure 6B:
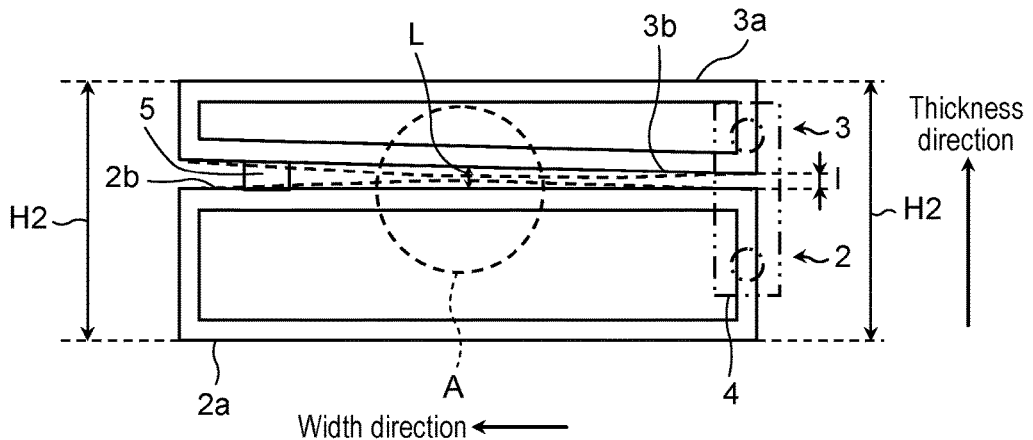
FIG. 6B schematically illustrates a cross section of the personal computer of FIG. 1 with the tablet configuration.

FIG. 6B illustrates respective cross sections of first and second housings 2 and 3 that are seen from a side of personal computer 1 with the tablet configuration. As shown in FIG. 6B, second housing 3 is shaped so that in the second configuration, clearance A formed between rear surface 2b of first housing 2 and rear surface 3b of second housing 3 changes in size in a substantially linear manner in the width direction. In other words, clearance A has size L at its center in the width direction and size I at its end along which hinge parts 4 are provided, and size L is greater than size I. The second configuration is such that rear surface 2b of first housing 2 and rear surface 3b of second housing 3 face each other and front surface 2a of first housing 2 and front surface 3a of second housing 3 are substantially parallel to each other. The size of clearance A is set based on a magnitude of a curvature (indicated by a dotted line) of rear surface 2b of first housing 2 and a magnitude of a curvature (indicated by a dotted line) of rear surface 3b of second housing 3. The magnitude of each of the curvatures is, for example, a magnitude of a greatest curvature that can be caused to the housing. Specifically, size L of clearance A at the center in the width direction is set greater than a sum of a magnitude of the curvature at a center of rear surface 2b of first housing 2 in the width direction and a magnitude of the curvature at a center of rear surface 3b of second housing 3 in the width direction. With clearance A set in this way, abutment between the respective curvatures of rear surfaces 2b and 3b of first and second housings 2 and 3 can be prevented in the tablet configuration. It is to be noted that rear surface 2b of first housing 2 is provided with leg 5, and this leg 5 abuts on rear surface 3b of second housing 3 in the tablet configuration, thereby ensuring size L for clearance A between rear surface 2b of first housing 2 and rear surface 3b of second housing 3.

3. Comparison with a Conventional Personal Computer

Figure 6C:
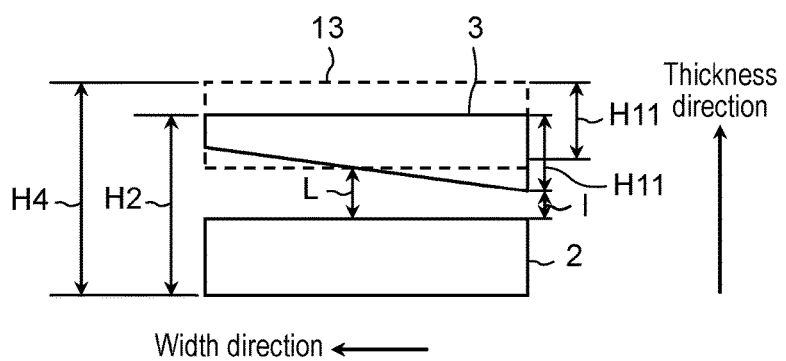
FIG. 6C schematically illustrates comparison between the personal computer of FIG. 1 and a conventional personal computer.
Figure 7A:
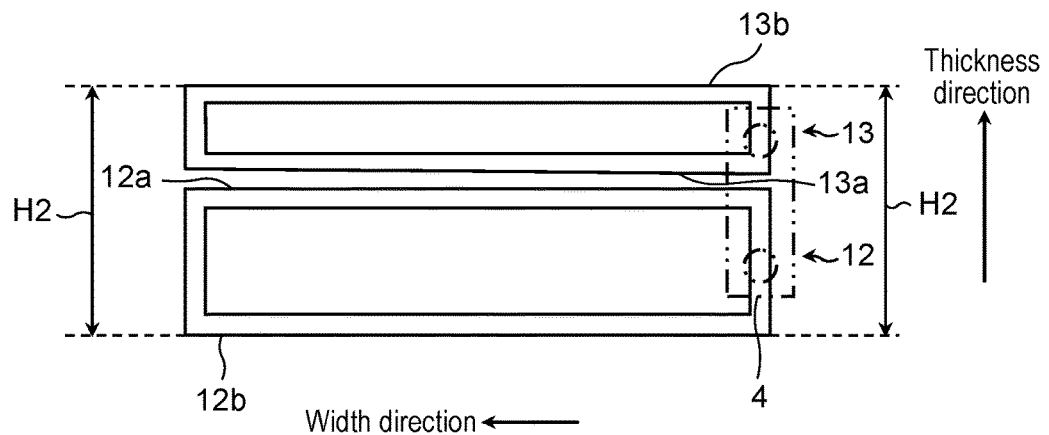
FIG. 7A schematically illustrates a cross section of the conventional personal computer with a closed configuration.

FIG. 7A illustrates respective cross sections of first and second housings 12 and 13 that are seen from a side of a conventional personal computer with a PC configuration (closed configuration) in which second housing 13 is closed. FIG. 6C schematically illustrates comparison between FIGS. 6B and 7B, indicating by a dotted line second housing 13 of the conventional personal computer with a tablet configuration.

When FIG. 6A is compared with FIG. 7A, rear thickness H2 of personal computer 1 of the present disclosure is identical to thickness H2 of the conventional personal computer.

Figure 7B:
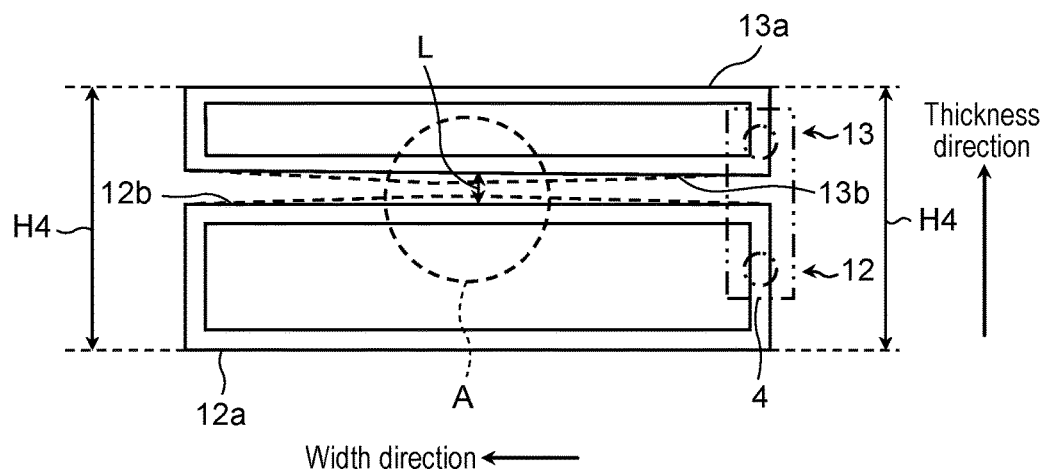
FIG. 7B schematically illustrates a cross section of the conventional personal computer with a tablet configuration.

FIG. 7B illustrates respective cross sections of first and second housings 12 and 13 that are seen from a side of the conventional personal computer with the tablet configuration. As shown in FIG. 7B, a distance between rear surface 12b of first housing 12 and rear surface 13b of second housing 13 is set to distance L that does not allow respective rear surfaces 12b and 13b of first and second housings 12 and 13 to come into contact with each other even with their respective convex curvatures at their center where their curvatures are greatest. The curvature of rear surface 12b of first housing 12 and the curvature of rear surface 13b of second housing 13 are indicated here by dotted lines, respectively.

In the conventional case, second housing 13 has a uniform thickness in a width direction. Accordingly, as shown in FIG. 7B, to ensure clearance A that does not allow respective rear surfaces 12b and 13b of first and second housings 12 and 13 to abut on each other as a result of their curvatures, personal computer 1 has its overall thickness increased in a thickness direction by size L of clearance A when personal computer 1 has the tablet configuration. On the other hand, rear surface 3b of second housing 3 is slanted in the present exemplary embodiment. Because of this, size I at the end (along which hinge parts 4 are provided) of clearance A can be made smaller than size L of clearance A at the center in the width direction. Thus, as shown in FIG. 6C, personal computer 1 of the present exemplary embodiment can have its thickness 112 less than thickness 114 of the conventional personal computer while ensuring identical size L of clearance A even when thickness H11 of the end of second housing 3 of personal computer 1 is set identical to thickness H11 of one end of second housing 13 of the conventional personal computer.

4. Effects and Others

As described above, personal computer 1 of the present exemplary embodiment includes first housing 2, second housing 3, and hinge parts 4 for connecting first housing 2 and second housing 3. First housing 2 has front surface (first primary surface) 2a at which the input unit is disposed, and rear surface (second primary surface) 2b opposite to the first primary surface. Second housing 3 has front surface (third primary surface) 3a provided with the display unit, and rear surface (fourth primary surface) 3b opposite to the third primary surface. Hinge parts 4 connect first housing 2 and second housing 3 so that an angle formed by the first primary surface of first housing 2 and the third primary surface of second housing 3 is capable of 360 degrees of change. Further, personal computer 1 has the first configuration in which the first primary surface and the third primary surface face each other to form an angle of substantially 0 degrees, and the second configuration in which the second primary surface and the fourth primary surface face each other and the first primary surface and the third primary surface are substantially parallel to each other. Second housing 3 (which may be replaced by first housing 2) is shaped so that in the second configuration, first clearance A formed between the second primary surface and the fourth primary surface increases in size in the substantially linear manner in a direction away from hinge parts 4.

In personal computer 1 of the present disclosure, second housing 3 is shaped so that in the tablet configuration (second configuration), first clearance A formed between the second primary surface of first housing 2 and the fourth primary surface of second housing 3 changes in size in the substantially linear manner in the width direction. It is to be noted here that the curvature (bulging) of each of the respective primary surfaces of housings 2 and 3 is greatest about its center in the width direction, while being insignificant at its ends in the width direction. Therefore, in the tablet configuration, the primary surfaces readily abut on each other about their center in the width direction where their curvatures are greatest. In other words, if the primary surfaces do not abut on each other about their above-mentioned center, these primary surfaces hardly ever abut on each other at any positions other than their center in the width direction.

With the structure described above, second housing 3 has, in the width direction, one of the ends that is thicker than the other end and has, about its center in the width direction, a thickness that is intermediate between the respective thicknesses of its ends. This means that when the one end of housing 2 or 3 has a thickness that is set identical to the thickness of the corresponding conventional housing, clearance A has, about its center in the width direction, the greater size than the size at the one end. Accordingly, as compared with the conventional personal computer, when personal computer 1 has the tablet configuration, personal computer 1 is unlikely to have the abutment between first housing 2 and second housing 3 that is caused by the respective convex curvatures of the primary surfaces of housings 2, 3. First housing 2 is thus prevented from being damaged. In addition, the above effect can be obtained without increase in the thickness of personal computer 1 having first housing 2 and second housing 3.

Furthermore, clearance A can be ensured between rear surface 2b of first housing 2 and rear surface 3b of second housing 3 with personal computer 1 having the reduced thickness, so that the thickness of personal computer 1 with the tablet configuration can be made substantially identical to a thickness of personal computer 1 with the closed configuration.

In personal computer 1 of the present exemplary embodiment, first housing 2 is formed to have the substantially uniform thickness, and second housing 3 is formed so that its thickness reduces in the direction away from hinge parts 4.

This structure can prevent contact between second housing 3 and first housing 2 at the center where the bulgings are greatest when personal computer 1 with the tablet configuration. Thus, first housing 2 and second housing 3 can be prevented from being damaged.

In personal computer 1 of the present exemplary embodiment, second housing 3 is formed to have a substantially uniform thickness, and first housing 2 is formed so that its thickness reduces in the direction away from hinge parts 4.

This structure can prevent contact between second housing 3 and first housing 2 at the center where the bulgings are greatest when personal computer 1 with the tablet configuration. Thus, first housing 2 and second housing 3 are prevented from being damaged.

In personal computer 1 according to the present exemplary embodiment, a first housing is formed so that its thickness reduces in the direction away from hinge parts 4, and a second housing is formed so that its thickness reduces in the direction away from hinge parts 4.

This structure can prevent contact between second housing 3 and first housing 2 at the center where the bulgings are greatest when personal computer 1 with the tablet configuration. Thus, first housing 2 and second housing 3 are prevented from being damaged.

Modified Example 1

Figure 8A:
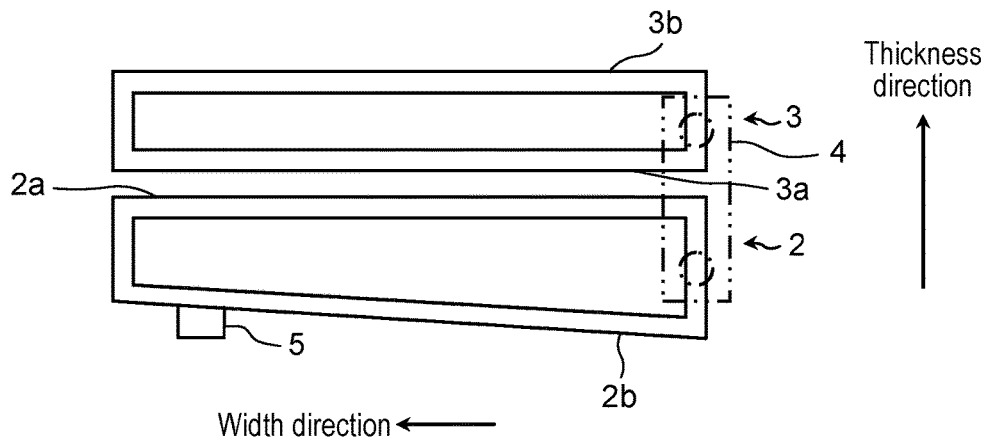
FIG. 8A schematically illustrates a cross section of a personal computer with a closed configuration according to a modified example of the first exemplary embodiment of the present disclosure.
Figure 8B:
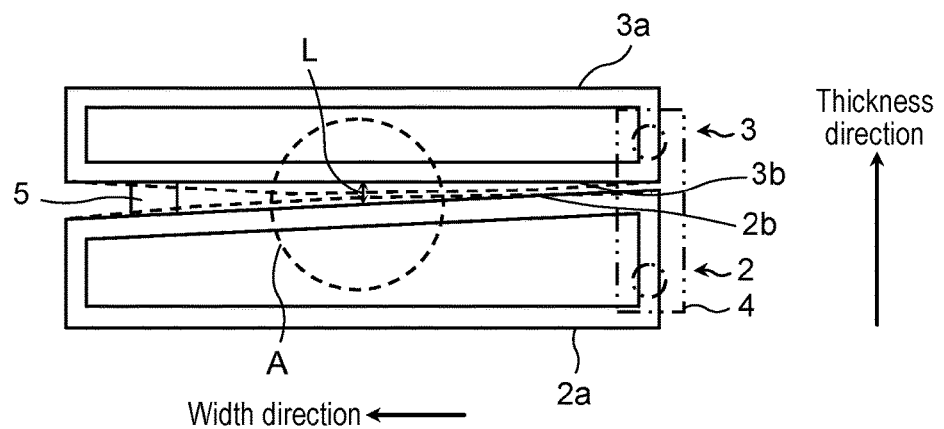
FIG. 8B schematically illustrates a cross section of the personal computer of FIG. 8A with a tablet configuration.

In the above exemplary embodiment, the description has been provided of the structure in which as shown in FIGS. 6A and 6B, the thickness of second housing 3 reduces in the direction from the rear side of personal computer 1 toward the front side of personal computer 1. However, the present disclosure is not limited to this. For example, as shown in FIGS. 8A and 8B, first housing 2 may be shaped so that in the second configuration, clearance A formed between rear surface 2b of first housing 2 and rear surface 3b of second housing 3 changes in size in a substantially linear manner in the width direction. In this case, second housing 3 has a substantially uniform thickness in the width direction, and first housing 2 is formed so that its thickness reduces in the width direction away from hinge parts 4. The reason why the thickness of second housing 3 is substantially uniform is because strictly speaking, second housing 3 does not have a uniform thickness because of being uneven at its surface for ensured robustness. Clearance A is thus set in the second configuration so as to increase in size in the substantially linear manner in the direction away from hinge parts 4. Even in this case, effects similar to those of the above exemplary embodiment can be obtained.

Modified Example 2

Figure 8C:
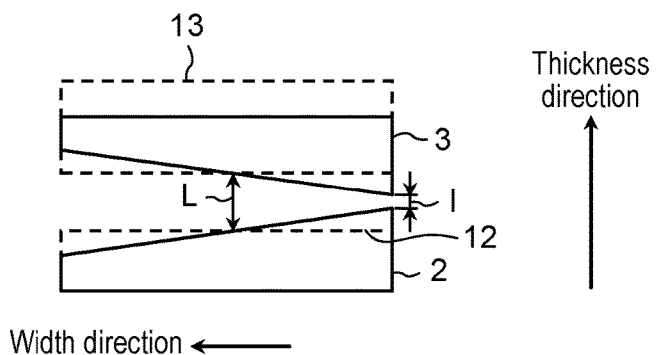
FIG. 8C schematically illustrates a cross section of a personal computer with a tablet configuration according to another modified example of the first exemplary embodiment of the present disclosure.

As shown in FIG. 8C, first housing 2 and second housing 3 may be formed so that their respective thicknesses reduce in the width direction away from hinge parts 4, thereby forming clearance A that increases in size in a substantially linear manner in the direction away from hinge parts 4 in the second configuration. In FIG. 8C, first housing 12 and second housing 13 of the conventional personal computer with the tablet configuration are indicated by dotted lines, respectively. Even in this case, effects similar to those of the above exemplary embodiment can be obtained.

Other Exemplary Embodiments

The first exemplary embodiment has been described above as being illustrative of the technique of the present disclosure but is not restrictive of the technique of the present disclosure. The technique of the present disclosure is also applicable to exemplary embodiments including appropriate modifications, replacements, additions, and omissions. Moreover, the components described in the first exemplary embodiment can be combined in a new exemplary embodiment.

In the exemplary embodiment described above, personal computer 1 has been described as an example of the electronic device, however, the present disclosure is not limited to this. The present disclosure is widely applicable to electronic devices each having a second housing capable of 360 degrees of rotation relative to a first housing, such as tablet terminals, mobile phones, movie cameras, portable TVs, and portable Blu-ray Disc (BD) players.

The exemplary embodiments have been described above as being illustrative of the technique of the present disclosure, and the appended drawings and the detailed description have been provided for this purpose.

For illustration of the above technique, the components shown in the appended drawings and described in the detailed description can include not only essential components but also components that are not essential. For this reason, those nonessential components that are shown in the appended drawings and described in the detailed description should not immediately be acknowledged as essential.

In addition, because the above exemplary embodiments are intended to be illustrative of the technique of the present disclosure, various modifications, replacements, additions, omissions, and others can be made within the scope of the claims or equivalents of the claims.

The present disclosure is applicable to any electronic devices that generate electromagnetic waves and heat. Specifically, the present disclosure is applicable to, for example, tablet terminals, mobile phones, movie cameras, portable TVs, and portable BD players.

What is claimed is:

1. An electronic device comprising:
a first housing;
a second housing; and
a hinge part for connecting the first housing and the second housing,
wherein the first housing has a first primary surface at which an input unit is disposed, and a second primary surface opposite to the first primary surface, the second primary surface being provided with a leg that protrudes away from the first primary surface,
the second housing has a third primary surface provided with a display unit, and a fourth primary surface opposite to the third primary surface,
the hinge part connects the first housing and the second housing so that an angle formed by the first primary surface and the third primary surface is capable of 360 degrees of change,
the electronic device has a first configuration in which the first primary surface and the third primary surface face each other to form an angle of substantially 0 degrees, and a second configuration in which the second primary surface and the fourth primary surface face each other and the first primary surface and the third primary surface are substantially parallel to each other,
at least one of the first housing and the second housing is shaped so that in the second configuration, a first clearance formed between the second primary surface and the fourth primary surface increases in size in a substantially linear manner in a direction away from the hinge part, and
the leg abuts the fourth primary surface in the second configuration.

2. The electronic device according to claim 1, wherein the first housing is formed to have a substantially uniform thickness, and the second housing is formed so that a thickness of the second housing reduces in the direction away from the hinge part.

3. The electronic device according to claim 1, wherein the second housing is formed to have a substantially uniform thickness, and the first housing is formed so that a thickness of the first housing reduces in the direction away from the hinge part.

4. The electronic device according to claim 1, wherein the first housing and the second housing are formed so that a thickness of the first housing and a thickness of the second housing reduce in the direction away from the hinge part.

5. The electronic device according to claim 1, wherein the input unit includes a keyboard, and the display unit includes a touch panel.

* * * * *